(12) United States Patent
Huang et al.

(10) Patent No.: US 10,475,544 B2
(45) Date of Patent: Nov. 12, 2019

(54) METHOD FOR OXIDATIVE DEGRADATION OF ION EXCHANGE RESIN

(71) Applicant: Institute of Nuclear Energy Research, Atomic Energy Council, Executive Yuan, R.O.C., Taoyuan (TW)

(72) Inventors: Chun-Ping Huang, Taoyuan (TW); Ying-Jing Li, Taoyuan (TW); Tung-Yi Chung, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 317 days.

(21) Appl. No.: 15/706,914

(22) Filed: Sep. 18, 2017

(65) Prior Publication Data
US 2019/0088378 A1    Mar. 21, 2019

(51) Int. Cl.
*G21F 9/30* (2006.01)
*B01J 47/016* (2017.01)

(52) U.S. Cl.
CPC .............. *G21F 9/30* (2013.01); *B01J 47/016* (2017.01)

(58) Field of Classification Search
CPC .................. G21F 9/30; B01J 47/016

USPC ............................................. 588/1
See application file for complete search history.

(56) References Cited

U.S. PATENT DOCUMENTS

| 6,147,274 | A | * | 11/2000 | Wood | ...................... | G21F 9/002 |
| | | | | | | 134/10 |
| 2014/0336355 | A1 | * | 11/2014 | Arendt | ................... | B01J 20/261 |
| | | | | | | 530/305 |

* cited by examiner

*Primary Examiner* — Edward M Johnson
(74) *Attorney, Agent, or Firm* — Jackson IPG PLLC; Demian K. Jackson

(57) ABSTRACT

A method of oxidative degradation is provided for waste of ion exchange resin. Therein, oxidative deactivation is processed through a fluidized bed. A column-type reactor is used to fluidize solid of the ion exchange resin. The reactor schematizes the input and output of an ion exchange resin, an oxidant, a catalyst and a fluid. The reactor controls the reaction temperature. The reactor separates solid and liquid, and uniformly distributes fluid. The present invention fluidizes the ion exchange resin in the reactor. The present invention processes oxidation within a controlled temperature range with the oxidant and catalyst added. The oxidation is maintained at high efficiency with easy control. The original structure and the characteristic of ion exchange of the ion exchange resin are destroyed.

10 Claims, 2 Drawing Sheets

METHOD FOR OXIDATIVE DEGRADATION OF ION EXCHANGE RESIN

TECHNICAL FIELD OF THE INVENTION

The present invention relates to oxidative degradation of ion exchange resin; more particularly, to dispossess the characteristic of ion exchange of the ion exchange resin for further degrading structure of the resin to obtain a deactivated and stabilized final product, where a technology is thus provided for nuclear energy industries to stabilize radioactive waste of ion exchange resin after water purification.

DESCRIPTION OF THE RELATED ARTS

Ion exchange resin is widely used for removing radioactive ions contained in a radioactive liquid in a nuclear facility. However, waste ion exchange resin is rich in highly active radioactive ions having a main structure of organism, which is not suitable for a long-term storage with stability. In a report "Application of Ion Exchange Processes for the Treatment of Radioactive Waste and Management of Spent Ion Exchangers" of IAEA, 2002, it is mentioned that the waste of resin can be treated by decomposing and direct-curing. Therein, the direct-curing can be cement curing, asphalt curing and glass curing; and the decomposing can be dry oxidation and wet oxidation.

The cement curing is simple with low cost. Its disadvantage is that the waste of resin will exchange calcium ions in the cement solid, which makes the resin unstable and swelled with water absorbed. The asphalt curing has good dissolution and small size, but it is not fire-safe and is low in compressive strength. The glass curing needs high equipment investment and has high operating cost.

The dry oxidation can be incineration and thermal cracking. The incineration burns the waste of resin mixed with combustible waste. The thermal cracking decomposes resin without oxygen at an operating temperature of 500~750 celsius degrees (° C.). The dry oxidation will generate harmful materials like sulfur oxides (SOx), nitrogen oxides (NOx), carbon monoxide (CO), and volatile organic gases, where radioactive nuclei like cesium-137 (Cs-137) may escape.

The wet oxidation can be supercritical water oxidation, plasma oxidation and Fenton oxidation. The supercritical water oxidation needs to be operated at a high temperature and a high pressure for treating the waste of resin and, thus, may corrode equipments. The plasma oxidation has a high cost, where residues of SOx, NOx, etc. may be left after oxidizing the waste of resin. A method has been developed for decomposing ion exchange resin through the Fenton oxidation. Therein, a mixing tank is used as a device for reaction. Before processing oxidation, the ion exchange resin is pre-treated and preheated into slurry. The temperature needs to be heated up to more than 90° C. for softening the resin and accelerating oxidative decomposition. However, the temperature of the solution in the reactor will be higher than the boiling point, which may cause problem to operation and control. In addition, additional additive has to be added during oxidation for adjusting the pH value. Cumbersome steps are the result.

On the other hand, on using the mixing tank as a device for the reaction of the reactant (ion exchange resin) with the oxidant and catalyst added, the oxidant and catalyst are diluted immediately during being added into the reactor, so that it is necessary to continuously heat up the temperature to maintain the reaction speed. Of no doubt, this will be significantly detrimental to cost and energy saving.

Hence, the prior arts do not fulfill all users' requests on actual use.

SUMMARY OF THE INVENTION

The main purpose of the present invention is to use a chemical reaction of fluidized bed for oxidizing and degrading an ion exchange resin, where the ion exchange resin is fluidized in a reactor and uniformly mixed with an oxidant and a catalyst (a transition metal salt); the oxidant and catalyst are highly concentrated in the reactor to be in touch with the reactant (the ion exchange resin); oxidative heat is used to maintain the reaction speed; and, through a heat exchanger, environment is controlled under the boiling point so that the entire oxidation reaction is maintained at high efficiency and easy to control.

Another purpose of the present invention is to provide a method particularly suitable for stabilizing radioactive waste of ion exchange resin after the water purification procedure in a nuclear energy industry, where the ion exchange resin dispossesses the characteristic of ion exchange and is further degraded so that the final product loses activity and is stabilized.

To achieve the above purposes, the present invention is a method for oxidative degradation of an ion exchange resin, comprising steps of: (a) obtaining a column-type reactor having a column, where the column has a cooling water inlet, a cooling water outlet, a reflux inlet, a reflux outlet, an oxidant inlet and a dispenser; the cooling water inlet is corresponding to the cooling water outlet and adjacent to the reflux inlet; the cooling water outlet is adjacent to the reflux outlet; and the dispenser is located between the reflux inlet and the oxidant inlet; (b) adding an ion exchange resin into the column; adding water and a transition metal salt into the column; and forming a fluidized bed by controlling a reaction of the ion exchange resin through a refluxing process or an aeration process; (c) processing the reaction in the column-type reactor at a temperature controlled between 40° C. and the boiling point; and (d) adding an oxidant from an oxidant inlet below the column; flowing the oxidant through a dispenser to process oxidation with the ion exchange resin to decompose and destroy original structure and characteristic of ion exchange of the ion exchange resin; and, after decomposing and liquefying the ion exchange resin, obtaining and outputting a final product from bottom of the column. Accordingly, a novel method for oxidative degradation of an ion exchange resin is obtained.

BRIEF DESCRIPTION OF THE DRAWINGS

The present invention will be better understood from the following detailed description of the preferred embodiment(s) according to the present invention, taken in conjunction with the accompanying drawing(s), in which.

DESCRIPTION OF THE PREFERRED EMBODIMENT

The following description of the preferred embodiment is provided to understand the features and the structures of the present invention.

Figure 1:
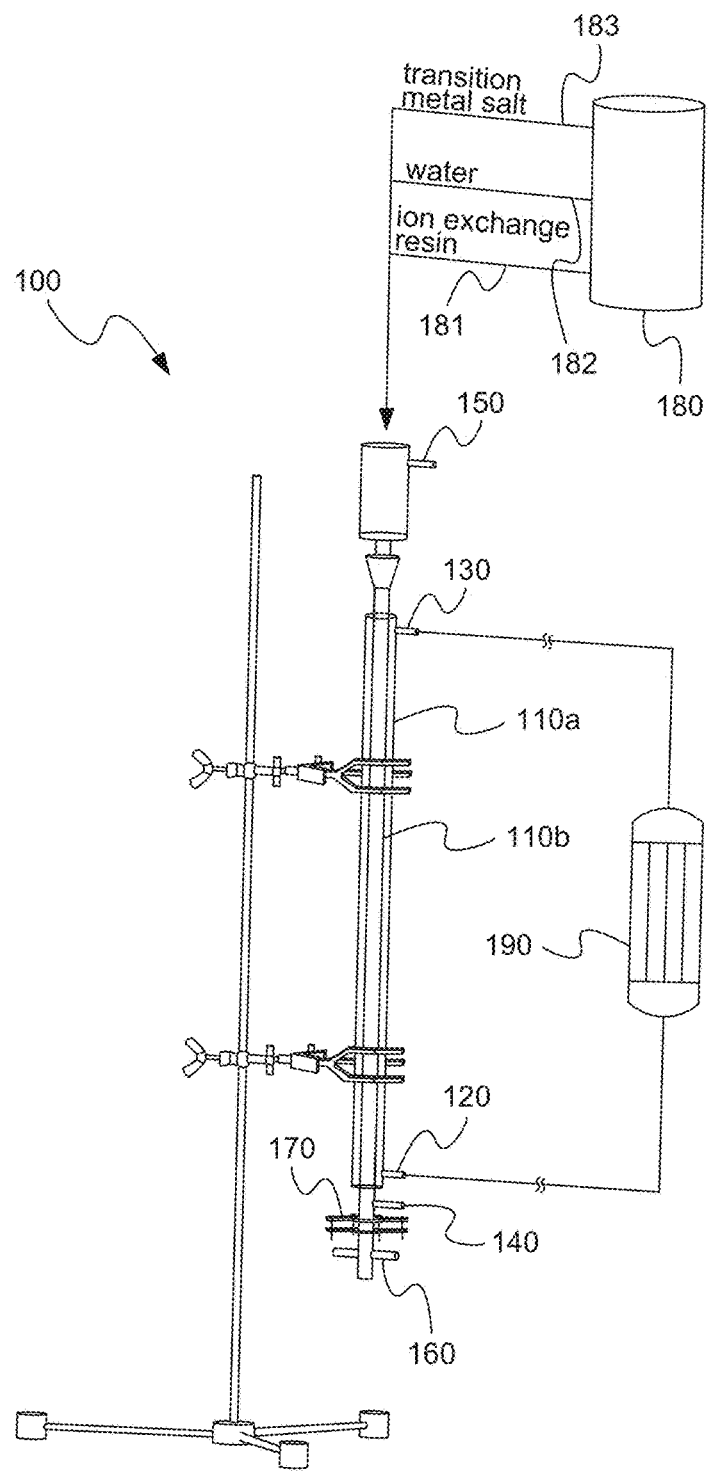
FIG. 1 is the view showing the device used for the preferred embodiment according to the present invention.
Figure 2:
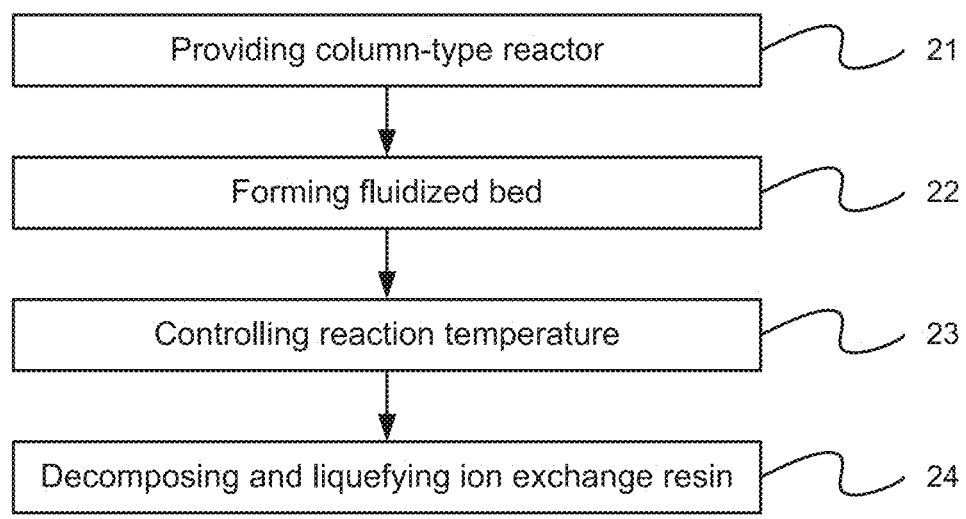
FIG. 2 is the flow view showing the preferred embodiment.

Please refer to FIG. 1 and FIG. 2, which are a view showing a device used for a preferred embodiment according to the present invention; and a flow view showing the preferred embodiment. As shown in the figures, the present invention is a method for oxidative degradation of an ion exchange resin, where waste of ion exchange resin is treated through oxidative deactivation in a form of a fluidized bed. The present invention comprises the following steps:

(a) Providing column-type reactor 21: A column-type reactor is provided. The column-type reactor is a two-sheath column-type reactor 100 having an outer column 110a and an inner column 110b inside the outer column 110a. The outer column 110a has a cooling water inlet 120 and a cooling water outlet 130. The inner column 110b has a reflux inlet 140, a reflux outlet 150, an oxidant inlet 160 and a dispenser 170. Therein, the cooling water inlet 120 is corresponding to the cooling water outlet 130 and is adjacent to the reflux inlet 140; the cooling water outlet 130 is adjacent to the reflux outlet 150; and the dispenser 170 is set between the reflux inlet 140 and the oxidant inlet 160.

(b) Forming fluidized bed 22: An ion exchange resin to be treated is added from top of the two-sheath column-type reactor 100 to enter into the inner column 110b. An appropriate amount of water and a transition metal salt (e.g. iron ion salt, copper ion salt, etc.) are added into the inner column 110b, where water is filled up to reach the reflux inlet 140 at upper part of the inner column 110b. Thus, A fluidized bed is formed by controlling a reaction of the ion exchange resin through a refluxing process or an aeration process. In the preferred embodiment, the two-sheath column-type reactor 100 further comprises a reactant feed source 180, where the ion exchange resin, water and the transition metal salt are transferred through a pipe for each 181,182,183 separately to enter into the inner column 110b of the two-sheath column-type reactor 100.

(c) Controlling reaction temperature 23: The temperature in the outer column 110a of the two-sheath column-type reactor 100 is controlled at 50 celsius degrees (° C.) to 90° C. for processing a reaction with cooling water. In the preferred embodiment, the two-sheath column-type reactor 100 further comprises a heat exchanger 190. Therein, the cooling water is transferred to the outer column 110a of the two-sheath column-type reactor 100 through the cooling water inlet 120; and the cooling water flowing through the outer column 110a is transferred back to the heat exchanger 190 through the cooling water inlet 130. Thus, the reaction temperature is controlled at 50° C.~90° C.

(d) Decomposing and liquefying ion exchange resin 24: An oxidant (e.g. hydrogen peroxide, potassium permanganate, etc.) is added in batches or continuously from the oxidant inlet below the inner column 110b. The dispenser 170 is made of a porous medium. The oxidant flows through the dispenser 170 to process oxidation with the ion exchange resin for decomposing and destroying original structure and ion exchange characteristic of the ion exchange resin. After decomposing and liquefying the exchange resin, the oxidant stops entering into the inner column 110b to end the reaction; and a liquefied final product is drained from bottom of the inner column 110b.

Thus, a novel method for oxidative degradation of an ion exchange resin is obtained.

As is known, the speed of oxidation is related to reaction temperature and reactant concentration and oxidation is generally an exothermic reaction. For effectively improving the speed and efficiency of the reaction used in the old technologies, the present invention improves the design of reactor and dosing method. In the present invention, a chemical reaction of fluidized bed is used to oxidize and degrade the ion exchange resin. The ion exchange resin is fluidized in the reactor and uniformly mixed with the oxidant and the catalyst (the transition metal salt). The oxidant and the catalyst are highly concentrated in the reactor to be in touch with the reactant (Ion exchange resin). Oxidative heat is used to maintain the reaction speed. Through the heat exchanger, the environment is controlled under the boiling point for the reaction, so that the entire oxidation reaction is maintained at high efficiency and easy to control. Thus, the present invention is particularly suitable for stabilizing the radioactive waste of ion exchange resin after the water purification procedure in a nuclear energy industry. Consequently, the ion exchange resin dispossesses the characteristic of ion exchange and is further degraded so that the final product loses activity and is stabilized.

To sum up, the present invention is a method for oxidative degradation of an ion exchange resin, where an ion exchange resin is fluidized in a reactor; an oxidant and a catalyst are added for processing oxidation within a controlled temperature range; and original structure and characteristic of the ion exchange are destroyed for obtaining a deactivated and stabilized final product.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for oxidative degradation of an ion exchange resin, comprising steps of:
    (a) obtaining a column-type reactor having a column, wherein said column has a cooling water inlet, a cooling water outlet, a reflux inlet, a reflux outlet, an oxidant inlet and a dispenser; said cooling water inlet is corresponding to said cooling water outlet and adjacent to said reflux inlet; said cooling water outlet is adjacent to said reflux outlet; and said dispenser is located between said reflux inlet and said oxidant inlet;
    (b) adding an ion exchange resin into said column; adding water and a transition metal salt into said column; and forming a fluidized bed by controlling a reaction of said ion exchange resin through a process selected from a group consisting of a refluxing process and an aeration process;
    (c) processing said reaction in said column-type reactor at a temperature controlled between 40 celsius degrees (° C.) and a boiling point; and
    (d) adding an oxidant from an oxidant inlet below said column; flowing said oxidant through a dispenser to process oxidation with said ion exchange resin to decompose and destroy original structure and ion exchange characteristic of said ion exchange resin; and, after decomposing and liquefying said ion exchange resin, obtaining and outputting a final product from bottom of said column.

2. The method according to claim 1,
    wherein said column-type reactor is a two-sheath column-type reactor and further comprises a heat exchanger; water flows from said cooling water inlet to enter into an outer column of said two-sheath column-type reactor; and water flowing in said outer column of said two-sheath column-type reactor enters into said heat exchanger through said cooling water outlet to process said reaction of said ion exchange resin with water and said transition metal salt at a controlled temperature of 50~90° C.

3. The method according to claim 2, wherein said column-type reactor further comprises a reactant feed source; and said ion exchange resin, water and said transition metal salt are transferred through a pipe for each separately to enter into an inner column of said two-sheath column-type reactor.

4. The method according to claim 1, wherein said column-type reactor further comprises a coil and water flows in said coil to process said reaction at a controlled temperature of 50~90° C.

5. The method according to claim 1, wherein said ion exchange resin, water and said transition metal salt are added to said column from a direction selected from a group consisting of a top-down direction, a vertical direction and a bottom-up direction.

6. The method according to claim 1, wherein, in step (b), said ion exchange resin is formed into said fluidized bed through a process selected from a group consisting of
(i) a refluxing process; and
(ii) an aeration process from bottom of said column.

7. The method according to claim 1, wherein said transition metal salt is selected from a group consisting of an iron ion salt and a copper ion salt.

8. The method according to claim 1, wherein, in step (d), said oxidant is added from said oxidant inlet below said column in a way selected from a group consisting of in batches and continuously.

9. The method according to claim 1, wherein said dispenser is made of a porous medium.

10. The method according to claim 1, wherein said oxidant is selected from a group consisting of hydrogen peroxide and potassium permanganate.

* * * * *